United States Patent
Tiirola et al.

(10) Patent No.: US 12,185,376 B2
(45) Date of Patent: Dec. 31, 2024

(54) SPECTRUM EXTENSION FOR INITIAL ACCESS

(71) Applicant: NOKIA TECHNOLOGIES OY, Espoo (FI)

(72) Inventors: Esa Tapani Tiirola, Oulu (FI); Kari Pekka Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 332 days.

(21) Appl. No.: 17/303,586

(22) Filed: Jun. 2, 2021

(65) Prior Publication Data

US 2022/0394771 A1 Dec. 8, 2022

(51) Int. Cl.
*H04W 74/0833* (2024.01)
*H04L 27/26* (2006.01)
*H04W 8/24* (2009.01)
*H04W 28/26* (2009.01)
*H04W 74/02* (2009.01)

(52) U.S. Cl.
CPC ..... *H04W 74/0833* (2013.01); *H04L 27/2607* (2013.01); *H04W 8/24* (2013.01); *H04W 28/26* (2013.01); *H04W 74/02* (2013.01)

(58) Field of Classification Search
None
See application file for complete search history.

(56) References Cited

U.S. PATENT DOCUMENTS

| | | | |
|---|---|---|---|
| 9,705,637 B2 | 7/2017 | Hassan et al. | |
| 2017/0367120 A1* | 12/2017 | Murray | H04W 74/0833 |
| 2019/0124697 A1* | 4/2019 | Tirronen | H04W 72/23 |
| 2021/0112603 A1* | 4/2021 | Xue | H04W 74/006 |
| 2021/0136828 A1* | 5/2021 | Hakola | H04W 74/0833 |
| 2021/0307074 A1* | 9/2021 | Si | H04L 27/2607 |
| 2022/0210844 A1* | 6/2022 | MolavianJazi | H04W 74/0866 |
| 2023/0092324 A1* | 3/2023 | Seidel | H04W 48/18 |
| | | | 370/329 |

FOREIGN PATENT DOCUMENTS

EP 2704348 A1 3/2014

OTHER PUBLICATIONS

3GPP TS 38.101-2 V16.4.0; 3rd Generation Partnership Project; Technical Specification Group Radio Access Network; NR; User Equipment (UE) radio transmission and reception; Part 2: Range 2 Standalone (Release 16); Jun. 2020; 173 pages.

* cited by examiner

*Primary Examiner* — Marcus Smith
(74) *Attorney, Agent, or Firm* — Brake Hughes Bellermann LLP

(57) ABSTRACT

Various techniques are provided for receiving, by a user equipment (UE) from an access node (AN), a first random access channel (RACH) configuration available for random access transmission, receiving, by the UE from the AN, a second RACH configuration including at least one reserved extended spectral resource and an indication configured to cause the UE to enable a spectrally extended RACH transmission, and communicating, by the UE to the AN, using at least a portion of a reserved extended spectral resources.

20 Claims, 8 Drawing Sheets

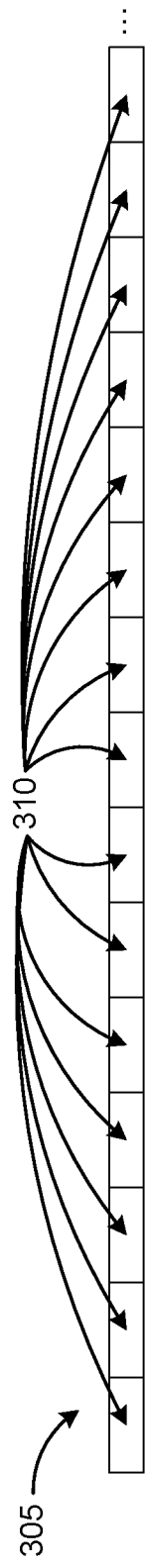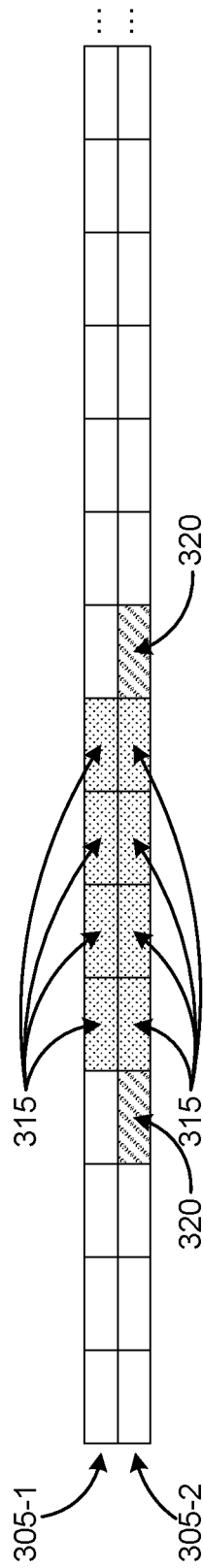
FIG. 3A
FIG. 3B

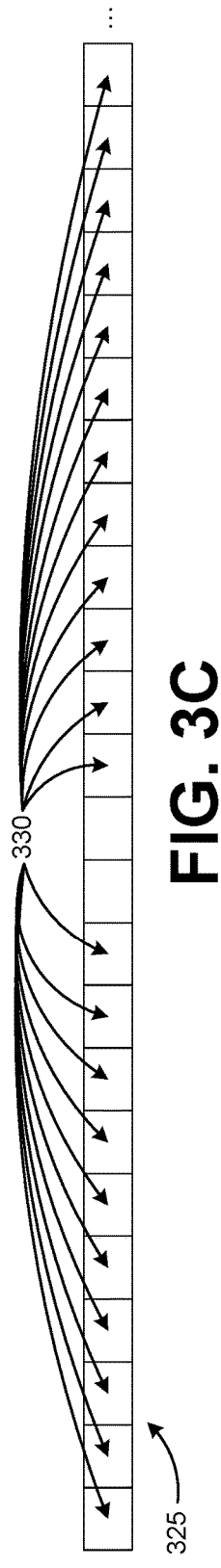
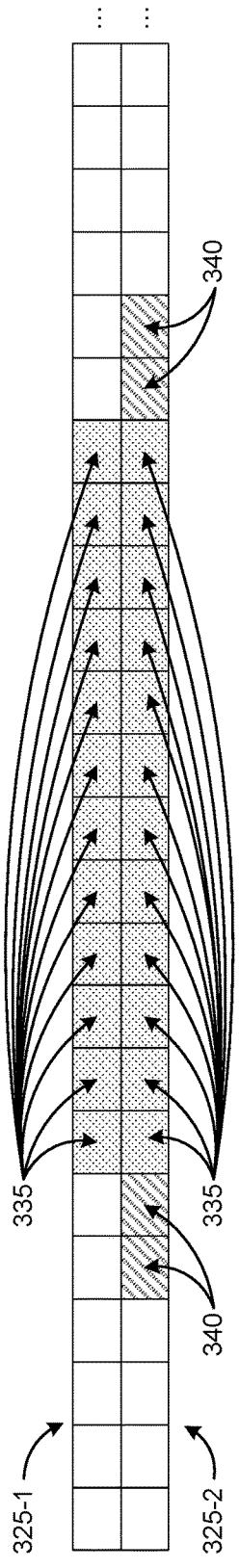
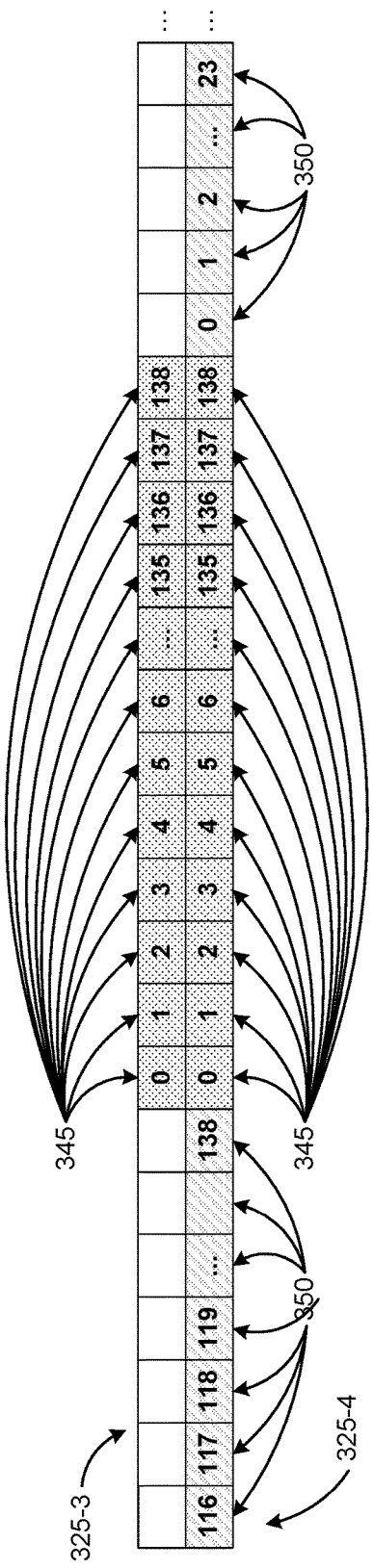
FIG. 3C
FIG. 3D
FIG. 3E

SPECTRUM EXTENSION FOR INITIAL ACCESS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

In a general aspect, a device, a system, a non-transitory computer-readable medium (having stored thereon computer executable program code which can be executed on a computer system), and/or a method can perform a process with a method including receiving, by a user equipment (UE) from an access node (AN), a first random access channel (RACH) configuration available for random access transmission, receiving, by the UE from the AN, a second RACH configuration including at least one reserved extended spectral resource and an indication configured to cause the UE to enable a spectrally extended RACH transmission, and communicating, by the UE to the AN, using at least a portion of a reserved extended spectral resources.

Implementations can include one or more of the following features. For example, the method can further comprise transmitting, from the UE to the AN, a message including UE capability information associated with the spectrally extended RACH transmission. The frequency/time resources of the first RACH configuration can be one of a subset of frequency/time resources of the second RACH configuration and the same as the frequency/time resources of the second RACH configuration, and cyclic shift resources can be split between the first RACH and the second RACH based on a predetermined configuration. The first RACH configuration and the second RACH configuration can use non-overlapping resources in at least one of frequency and time. The UE can select between the first RACH and second RACH configuration based on at least one of UE capability, RACH transmission power, Msg3 payload, and path loss. The UE can use a preconfigured quantity of the at least one reserved extended spectral resource by symmetrical extension of the random access transmission, and an amount of extension can be determined based on the preconfigured quantity.

The UE can use a UE varied quantity of the at least one reserved extended spectral resource. The at least one reserved extended spectral resource can be valid for a predefined time period. The second RACH configuration can include at least one of a size of an extended band, a frequency/time location of at least one Physical Random Access Channel (PRACH) resource, at least one cyclic shift available for the at least one reserved extended spectral resource, and at least one property associated with a spectrum shaping filter. The indication configured to cause the UE to enable the spectrally extended RACH transmission can be received in a System Information Block Type 1 (SIB-1) message. The at least one reserved extended spectral resource can be a dedicated PRACH resource pool associated with at least one UE supporting spectrally extended random access transmission. The UE availability for the spectrally extended RACH transmission can be based on a message size of an uplink message 3 (Msg3).

The method can further comprise determining, by the UE, an uplink (UL) transmission based on Frequency Domain Spectral Shaping (FDSS) and transmitting, from the UE to the AN, at least one random access procedure message including the UL transmission. The spectrally extended RACH transmission can be associated with at least one of a PRACH, a Random Access (RA) Msg3, a RA message A (MsgA), a Contention based PRACH, and a Contention-Free PRACH. The method can further comprise receiving, by the UE from the AN, a system information block (SIB) via one of Radio Resource Control (RRC) signalling or broadcast signalling, the SIB indicating the spectrally extended RACH transmission is available for Group A preambles and Group B preambles. The method can further comprise receiving, by the UE from the AN, a SIB via one of RRC signalling or broadcast signalling, the SIB indicating the spectrally extended RACH transmission is available only for Group A preambles. The method can further comprise receiving, by the UE from the AN, a SIB via one of RRC signalling or broadcast signalling, the SIB indicating at least one of the spectrally extended RACH transmission is available for Group A preambles to a first group of UE's, the spectrally extended RACH transmission is not available for Group A preambles to a second group of UE's, and FDSS with spectrally extended random access transmission uses a Group A preamble.

In another general aspect, a device, a system, a non-transitory computer-readable medium (having stored thereon computer executable program code which can be executed on a computer system), and/or a method can perform a process with a method including transmitting, from an access node (AN) to a user equipment (UE), a first random access channel (RACH) configuration available for random access transmission, determining that spectrally extended RACH transmission is to be used in a cell serviced by the AN, and in response to determining that spectrally extended RACH transmission is to be used in the cell transmitting, from the AN to the UE, a second RACH configuration available for random access transmission, the second RACH configuration including at least one reserved extended spectral resource and one of an indication configured to cause at least one UE in the cell to enable a spectrally extended RACH transmission or an implicit indication of enabling the spectrally extended RACH transmission associated with the second RACH and attempting, by the AN, to receive a transmission using RACH based on to the first RACH configuration and the second RACH configuration.

Implementations can include one or more of the following features. For example, the method can further comprise receiving, by the AN from the UE, a message including UE capability information associated with the spectrally extended RACH transmission. The frequency/time resources of the first RACH configuration can be one of a subset of frequency/time resources of the second RACH configuration and the same as the frequency/time resources of the second RACH configuration and cyclic shift resources can be split between the first RACH and the second RACH based on a predetermined configuration. The first RACH configuration and the second RACH configuration can use non-overlapping resources in at least one of frequency and time. The second RACH configuration can instruct the UE to use a preconfigured quantity of the at least one reserved extended spectral resource by symmetrical extension of the random access transmission and an amount of extension can be determined based on the preconfigured quantity. The second RACH configuration can instruct the UE to use a UE varied quantity of the at least one reserved extended spectral resource.

The at least one reserved extended spectral resource can be valid for a predefined time period. The second RACH configuration can include at least one of a size of an extended band, a frequency/time location of at least one Physical Random Access Channel (PRACH) resource, at least one cyclic shift available for the at least one reserved extended spectral resource, and at least one property associated with a spectrum shaping filter. The second RACH configuration can be communicated via a System Information Block Type 1 (SIB-1) message. The at least one reserved extended spectral resource can be a dedicated PRACH resource pool associated with at least one UE supporting spectrally extended random access transmission. The determining that at least one UE is capable of a spectrally extended RACH transmission can be based on a message size of an uplink message 3 (Msg3). The spectrally extended random access transmission can be associated with at least one of a PRACH, a Random Access (RA) Msg3, a RA message A (MsgA), a Contention based PRACH, and a Contention-Free PRACH.

The method can further comprise communicating, by the AN to the UE, a system information block (SIB) via one of Radio Resource Control (RRC) signalling or broadcast signalling, the SIB indicating the spectrally extended random access transmission is available for Group A preambles and Group B preambles. The method can further comprise communicating, by the AN to the UE, a SIB via one of RRC signalling or broadcast signalling, the SIB indicating the spectrally extended random access transmission is available only for Group A preambles. The method can further comprise communicating, by the AN to the UE, a SIB via one of RRC signalling or broadcast signalling, the SIB indicating at least one of the spectrally extended random access transmission is available for Group A preambles to a first group of UE's, the spectrally extended random access transmission is not available for Group A preambles to a second group of UE's, and Frequency Domain Spectral Shaping (FDSS) with spectrally extended random access transmission uses a Group A preamble.

The details of one or more examples of embodiments are set forth in the accompanying drawings and the description below. Other features will be apparent from the description and drawings, and from the claims.

BRIEF DESCRIPTION OF THE DRAWINGS

FIGS. 3A to 3D are block diagrams illustrating resource block grids according to an example embodiment.

FIG. 3E illustrates a grid of frequency domain resource elements according to an example embodiment.

DETAILED DESCRIPTION

Figure 1:
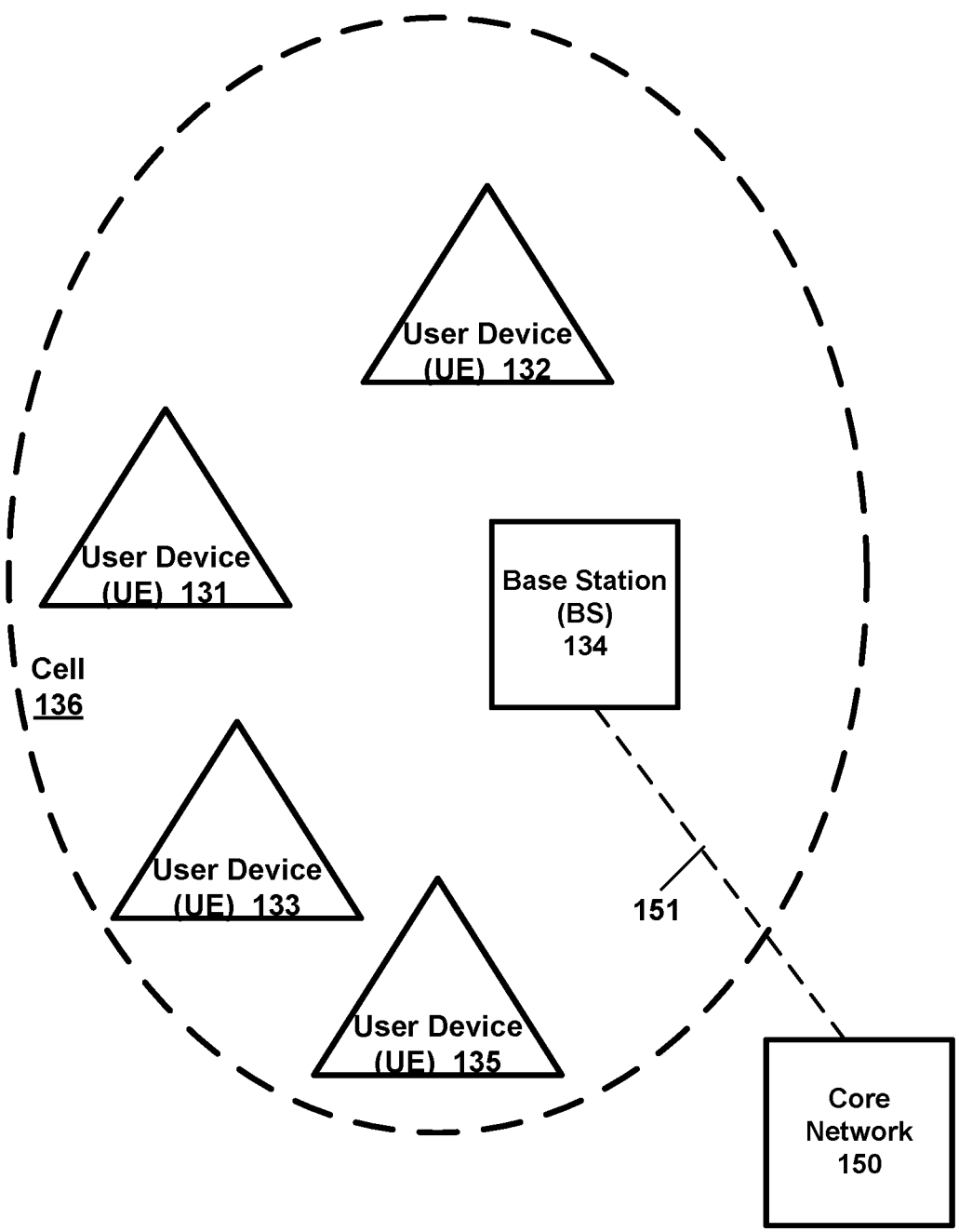
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node.

Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR). In addition, by way of illustrative example, the various example embodiments or techniques described herein may be applied to various types of user devices or data service types, or may apply to user devices that may have multiple applications running thereon that may be of different data service types.

New Radio (NR or 5G) development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (NR or 5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE). The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

This invention relates to UL modulation enhancements, more specifically Frequency domain spectrum shaping (FDSS) with spectral extension. In this IR we focus on the initial access scenario, i.e., Random Access Message 3 and physical random access channel (PRACH) scenarios.

Figure 2A:
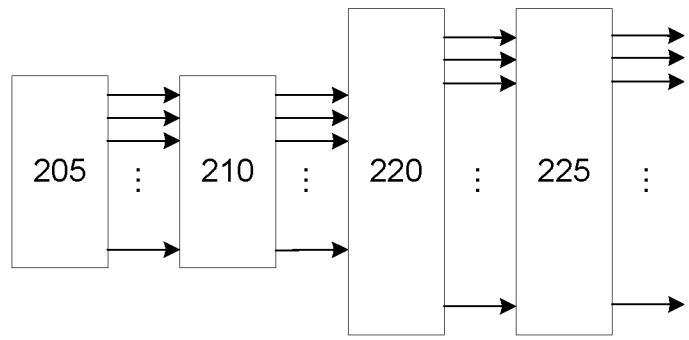
FIG. 2A is a block diagram illustrating a transmitter according to an example embodiment.
Figure 2B:
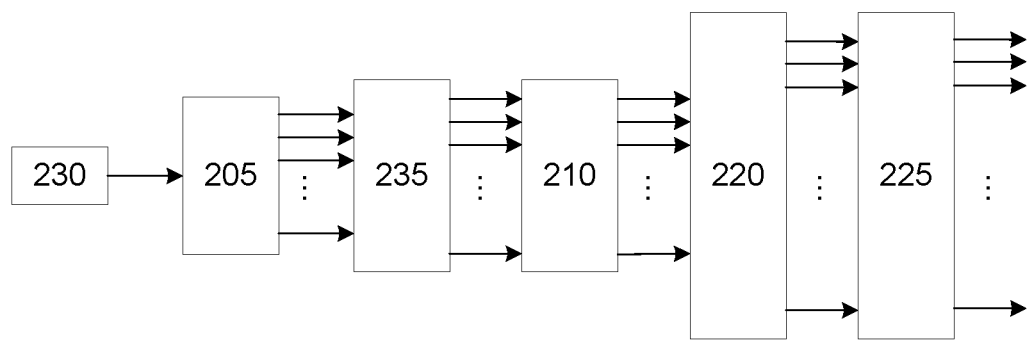
FIG. 2B is a block diagram illustrating a transmitter according to an example embodiment.

Spectral shaping can be applied with or without spectral extension. A block diagram illustrating a New Radio (NR), 3GPP NR and/or 5G NR UL transmitter with spectral shaping without spectrum extension chain is illustrated in FIG. 2A, and a block diagram illustrating a NR, 3GPP NR and/or 5G NR UL transmitter with spectral shaping with spectrum extension is illustrated in FIG. 2B. As shown in FIG. 2A and FIG. 2B, the NR UL transmitter example implementations include a Discrete Fourier Transform (DFT) 205 block, a FDSS 210 block, a subcarrier mapping 220 block, and an Inverse Fast Fourier Transform (IFFT) 225 block. As shown in FIG. 2B, the NR UL transmitter example implementation further includes a data 230 block and a symmetric extension 235 block. Although not shown, an example implementation can include generating a spectrum extension that is non-symmetric. In other words, the symmetric extension 235 block could be replaced by an extension block or a non-symmetric extension block.

The DFT 205 can be configured to pre-code at least one resource block (RB) or physical resource block (PRB). An RB and/or PRB can be the smallest element of resource allocation associated with a UL/DL transmission, Precoding can include, at least, reducing the cubic metric associated with the transmitted signal. An input to the DFT 205 can be a plurality of symbols where the number of symbols corresponds to the number of subcarriers (sometimes called virtual subcarriers). In the example illustrated by FIG. 2A, the output of the DFT 205 is input to the FDSS 210. In the example illustrated by FIG. 2B, the output of the DFT 205 is input to the symmetric extension 235. The symmetric extension 235 can be configured to distribute transformed additional RB(s) (e.g., for spectral extension) evenly within additional bandwidth. For example, resource allocation can be such that the same number of RB/PRB(s) are added before and after in-band allocated resources. Spectrum extension can also be non-symmetric. In other words, spectrum extension can distribute transformed additional RB using additional bandwidth that is unequal on either end of the in-band portion of a transmission. For example, resource allocation can be such that a weighted number, a predefined number, an unequal percentage, and/or the like of RB/PRB(s) are added before and after in-band allocated resources.

The FDSS 210 can be configured to weight transition band bins before the subcarrier mapping 220 block maps the bins to the IFFT 225 input. The FDSS 210 of FIG. 2B (e.g., FDSS with spectrum extension) can further include an extension block (e.g., of bins) that can be associated with excess bands for spectrum extension. A shaping function associated with the FDSS 210 of FIG. 2A (e.g., FDSS without spectrum extension) can include a trade-off between demodulation performance and a Tx power gain. However, while a shaping function associated with the FDSS 210 of FIG. 2A (e.g., FDSS with spectrum extension) can include a trade-off between spectral efficiency and Tx power gain.

NR priority coverage scenarios can include:
1st priority
   PUSCH for eMBB (for FDD and TDD with DDDSU, DDDSUDDSUU and DDDDDDDSUU)
   PUSCH for VoIP (for FDD and TDD with DDDSU, DDDSUDDSUU)
2nd priority
   PRACH format B4
   PUSCH of Msg.3
   PUCCH format 1
   PUCCH format 3 with 11bit
   PUCCH format 3 with 22bit
   Broadcast PDCCH The above NR priority coverage scenarios may be scenarios that requires coverage enhancements (e.g., at least one channel with a bottleneck). Bottleneck channels can include UL channels (except Broadcast PDCCH). PRACH and RA Msg3 can be among the bottleneck channels for both FR1 and FR2. The following channels are identified as the potential bottleneck channels for Urban 28 GHz scenario:
   PUSCH eMBB (DDDSU and DDSU)
   PUSCH VoIP (DDDSU and DDSU)
   PUCCH F3 11bits
   PUCCH F3 22bits
   PRACH B4
   PUSCH of Msg3

When FDSS with spectrum extension is introduced for PUSCH, the coverage balance between PUSCH and random access channel (RACH) (PRACH and RA Msg3) may change. In other words, RACH performance can worsen compared to PUSCH (eMBB and VoIP). In addition, there may be no coverage improvement for PRACH. In other words, PRACH may remain as a bottleneck channel while PUSCH and RA Msg3 performance is being improved. Further, the cubic metric (CM) of PRACH can depend on the sequence index and 50% of NR PRACH sequences can have higher CM compared to QPSK modulated data. High CM may limit available transmission power because the CM difference may necessitate compensation by a higher transmitter back-off value in order to achieve acceptable error vector magnitude (EVM) requirement(s).

Accordingly, example implementations can solve the problems (1) how to support FDSS with spectrum extension for RACH channels (e.g., PRACH and RA Msg3), and (2) depending on the scenario, the gNB may or may not know the UE's capability for spectrum extension (e.g., support/not support) when receiving PRACH preamble and/or RA Msg3.

Example implementations can solve these problems by configuring an opportunistic usage for spectrum extension in the case of initial access. Example implementations can support spectrally extended transmission if there are one or more UEs in the cell and if the spectrally extended transmission has been enabled (e.g., switched on). For example, the UEs can utilize excess band when transmitting random access signals (PRACH and/or RA msg3). This allows coverage extension in the initial access phase. The gNB can be configured to provide an explicit allowance for spectrally extended transmission. Triggering the usage for spectrum extension can be in response to the gNB determining that some criteria is fulfilled. In an example implementation, the criteria can include at least one of the gNB determines that PRACH (or RA Msg3) would benefit from improved coverage (e.g., large cell, cell with potential coverage problem, and/or the like), the gNB determines that there can be (or there are) UEs supporting spectrum extension for RACH in the cell area (e.g., using historical UE capability information), the gNB determines that current hardware supports spectrum extension for RACH, the gNB determines that spectrum extension is feasible based on UL capacity, and/or the like. Example implementations can include the gNB explicitly signalling spectrally extended transmission on/off. The signalling can also cause the reservation of a predefined excess band around indicated RBs. In addition, the allowance may be valid for a predefined time period (e.g., during PRACH occasions and/or when UE is transmitting RA Msg3).

In an example implementation, a gNB receiver operation may not change depending on the UE's transmission scheme. In other words, the gNB operation may not change during UE operation with spectrum extension and during UE operation without spectrum extension). For example, the gNB may ignore (e.g., perform no operations associated with) the excess band signal because a spectrally extended transmission can be arranged such that the in-band portion of the transmission is the same with and without spectral extension. The transmission scheme can be applied for both RA Msg3 and for PRACH.

FIG. 3A illustrates an example PRB grid 305 including a plurality of PRBs 310. FIG. 3B illustrates an example PRB grid 305-1 including a plurality of in-band PRBs 315 and excess band PRBs 320. The example implementation illustrated in FIG. 3B shows that the plurality of in-band PRBs 315 are in the same position in the PRB grid 305-1 that does not include spectrum extension (e.g., no excess band PRBs) and in the PRB grid 305-2 that does include spectrum extension. In the implementation illustrated by FIG. 3B, the gNB does not necessarily have to perform any operations associated with an excess band signal when there isn't one (e.g., PRB grid 305-1) even if the transmitting UE is capable (and configured) to transmit with spectral extension. No additional configuration of the gNB is necessary because the UE transmits using in-band PRBs 315 in the same position whether or not the UE transmits with spectral extension. Using this technique, the UE can opportunistically (e.g., selectively, without additional signalling from the gNB and/or the like) transmit using spectral extension.

The gNB can utilize both in-band and excess band signals when receiving spectrally extended transmission without blind detection of the actual format. This technique may require that gNB is aware of the UE's transmission scheme. For example, this technique can be applied for short sequence transmission (e.g., the RA preamble) an example of which can be illustrated by FIG. 3B. This technique can be applied for RA Msg3. For example, the gNB can be aware of the UE capability based on a received RA preamble to use this technique for RA Msg3. Accordingly, for the RA preamble, the received signal may be correlated with a sequence including both in-band and excess band (instead of an in-band only signal).

UEs supporting spectrum extension can enable preambles with spectrum extension. The preambles can be transmitted via separate PRACH resource pools. For example, additional frequency/time/code resources can be allocated to UEs supporting FDSS with spectrum extension. Should a UE be coverage limited based on a predefined metric (e.g., path loss), separate PRACH resource pools can also be utilized. In an example implementation, the separate resource pool can be frequency domain multiplexed with legacy PRACH, and the availability of this pool can be indicated using, for example, RMSI (SIB-1).

FIG. 3C illustrates an example PRB grid 325 including a plurality of PRBs 330. FIG. 3D illustrates an example PRB grid 325-1, 325-2 including a plurality of in-band PRBs 335 and excess band PRBs 340. The example implementation illustrated in FIG. 3D shows that the plurality of in-band PRBs 335 are in the same position in the PRB grid 325-1 that does not include spectrum extension (e.g., no excess band PRBs) and in the PRB grid 325-2 that does include spectrum extension. The existing PRACH resource pool can be split in cyclic shift domain. For example, FIG. D can be used to illustrate the split PRACH resource pool. In an example implementation, portion of the cyclic shifts can be reserved for FDSS with spectrum extension (e.g., K cyclic shifts). The remainder of the cyclic shifts can be reserved for legacy operation (e.g., without spectrum extension). Two transmission schemes can be orthogonally multiplexed provided that in-band portion is the same for both (as illustrated in FIG. 3D). Signaling details are described below. In this implementation, if FDSS for PRACH is not configured, then the UEs may use legacy PRACH. In other words, FDSS with spectrum extension may not be used.

FIG. 3E illustrates an example grid of frequency domain resource elements 325-3, 325-4 including a plurality of in-band REs 345 and excess band REs 340. The example implementation illustrated in FIG. 3D shows that the plurality of in-band PRBs 345 are in the same position in the PRB/RE grid 325-3 that does not include spectrum extension (e.g., no excess band PRBs) and in the PRB grid 325-4 that does include spectrum extension. FIG. 3E is an example implementation illustrating how to map a legacy PRACH sequence and the extended sequence in the frequency domain resource elements. The example corresponds to symmetric extension (e.g., 25%). Different cyclic shifts can be obtained by cyclic shifts of the original sequence (e.g., [3, 4, 5, . . . 138, 0, 1, 2]). An extended sequence can be obtained in the same way as described below. A product, standard, and/or the like specification may be used to define the valid cyclic shifts (e.g., 64) for a given base sequence. If K PRBs are reserved to be used with spectrum extension 64-K can be available for legacy operation.

Signaling implementations may include signaling spectrum extension opportunity for RA preamble and signaling spectrum extension opportunity for RA Msg3. The spectrum extension opportunity for RA preamble can be indicated via Remaining Minimum System Information (RMSI), sometimes called SIB-1. The indication can include at least one of spectrum extension (e.g., allowed/not allowed), size of the excess band (if configurable), frequency/time location of PRACH resources (if separate PRACH resources can be used), and cyclic shifts available for the case of spectrum extension (if existing PRACH resources can be used). The properties of the FDSS filter depending on the scenario (if configurable) can include at least one of the filter (e.g., defined in time or frequency), and boundary conditions for the FDSS filter (e.g., maximum and/or minimum attenuation for different frequencies with respect to the center frequency). One or more these details may be defined by the specification. The spectrum extension opportunity for RA Msg3 can also be indicated via RMSI. However, in an example implementation, the spectrum extension opportunity for RA Msg3 can be indicated via RA Msg2 (e.g., random access response). This can enable dynamically selectable transmission scheme for RA Msg2 based on, for example, the UL loading situation in the cell.

Both PRACH and RA Msg3 can utilize a symmetric extension transmission scheme or other extension scheme. Depending on the scenario, gNB may or may not know the actual transmission scheme at the UE. In these cases, the transmission scheme can be defined at least partially by the UE. In an example implementation, the minimum requirement may be that the gNB is configured to know how the in-band portion is transmitted, and the (maximum) size of the excess band. The gNB may also be configured to know at least partially the boundary conditions for the FDSS filter design. In some scenarios, the FDSS processing can be defined by a standard. There are three reserved bits (two in MAC sub-header, one in MAC payload) that can be used to indicate the spectrum extension opportunities for UE (transmitting RA Msg3).

PRACH preambles for contention based (CB) transmission or contention based random access (CBRA) can be split into two types or groups. CB transmission or CBRA transmission may be carried out using at least one common resource (e.g., a preamble) shared with other devices (e.g., UEs). A first preamble type is a short preamble or group A preamble and a second preamble type is a long preamble or group B preamble. Group B is based on a long sequence length (e.g., L=839) and one of two subcarrier spacings (e.g., 1.25 kHz or 5 kHz). Group B can use a numerology (e.g., frequency) different from any other NR transmission. Group B may be used for frequency bands below frequency range one (FR1) (e.g., 6 GHz). Group B includes scenarios where Msg3 size is greater than a predefined threshold and the pathloss is less than a predefined threshold. In group B if the potential Msg3 size (e.g., UL data available for transmission plus MAC subheader, and where required MAC CEs) is greater than a predefined setting (e.g., ra-Msg3SizeGroupA) and the pathloss is less than a maximum pathloss (e.g., PCMAX) of the Serving Cell performing the Random Access Procedure or if the RA procedure was initiated for the CCCH logical channel and the CCCH SDU size plus MAC subheader is greater than a predefined setting (e.g., ra-Msg3 SizeGroupA). Group A includes scenarios where coverage is limited, or payloads are small.

Group A is based on a short sequence length (e.g., L=139) and normal NR subcarrier spacing. Group A may be used for frequency bands below FR1 and frequency range two (FR2). Therefore, subcarrier spacing can be based on FR1 (e.g., 15 kHz or 30 kHz) or FR2 (e.g., 60 kHz or 120 kHz). In group A, the numerology (e.g., frequency) resources is based on the same resources as the RACH. In CBRA, PRACH with spectrum extension can be triggered in a Handover procedure (e.g., from a source cell to a target cell). In this implementation, the UE can use a dedicated (e.g., contention free) preamble when transmitting PRACH towards the target cell.

The grouping can further involve FDSS with spectrum extension. For example, spectrum extension can be available for both group A and group B if indicated by RMSI (SIB-1). In another implementation, spectrum extension can always available only for Group A, if indicated by RMSI. In yet another implementation, the signaling can be modified in such that Group A exists but legacy UEs don't use Group A, and FDSS with spectrum extension can use a Group A preamble. This implementation can include configuring one or more of the available spare IEs (e.g., as indicated by ra-Msg3SizeGroupA) to switch such functionality ON. For example, the field spare6 can be considered as a threshold of 0 bits for UEs supporting or using FDSS with spectrum extension. Other threshold values can be defined as well. The functionality related to power offset for group B (e.g., messagePowerOffsetGroupB) can be kept or alternatively ignored when using group A for FDSS with spectrum extension.

Figure 4:
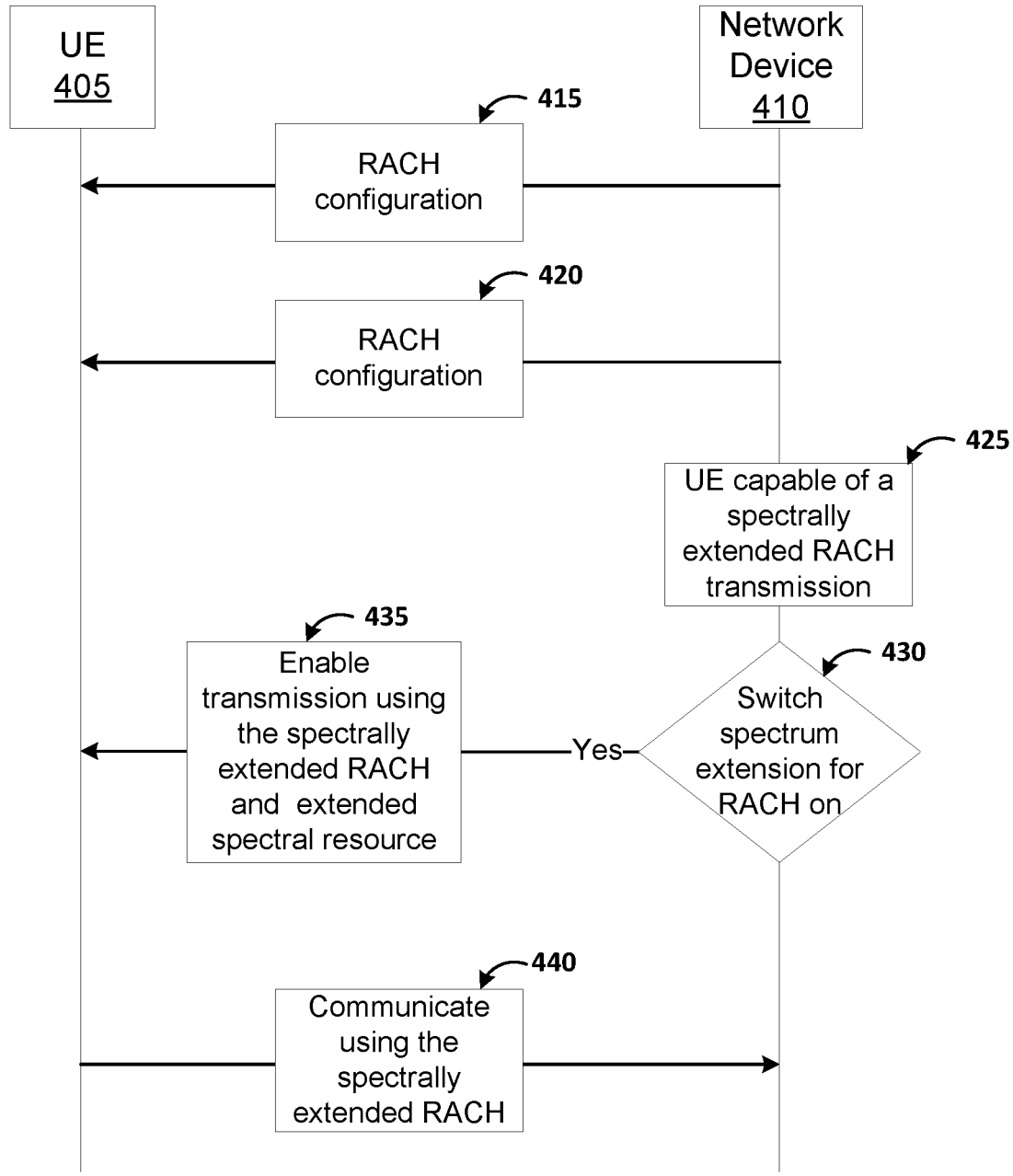
FIG. 4 is a signal flow diagram to enable spectrally extended RACH transmission according to an example embodiment.

FIG. 4 is a block diagram illustrating a signal flow according to an example implementation. As shown in FIG. 4, a user equipment UE 405 can be communicatively (e.g., wirelessly) coupled to a network device 410. The network device 410 can be a base station (BS), which may also be referred to as an access point (AP), an access node (AN), an enhanced Node B (eNB), a BS, next generation Node B (gNB), a next generation enhanced Node B (ng-eNB), or a network node.

The signal flow can begin with a first RACH configuration (415) message communicated from the network device 410 to the UE 405. Next, a second RACH configuration (420) message communicated from the network device 410 to the UE 405. The network device determines (whether or not) at least one UE (e.g., including UE 405) in a cell serviced by the network device 410 is (or may be) capable of spectrally extended RACH transmission (425). After determining that at least one UE is capable of spectrally extended RACH transmission, the network device 410 can switch on (e.g., enable, cause the enabling of, and/or the like) spectrum extension for RACH. For example, the network device 410 can consider cell type, availability of UEs capable of performing spectrum extension and other criteria in addition to having at least one UE is capable of spectrally extended RACH transmission when deciding to switch (e.g., enable) spectrally extended RACH transmission on. In some scenarios (e.g., for PRACH), the network device 410 may not know the availability (e.g., in an initial access scenario) at least one UE is capable of spectral extension. However, in some scenarios, the RA msg3 may be available and include information used to determine UE spectral extension capability.

The frequency/time resources of the first RACH configuration (415) can be a subset of the frequency/time resources of the second RACH configuration. Cyclic shifts resources can be split between the first RACH configuration (415) and the second RACH configuration (420) in a predetermined manner. The first RACH configuration (415) and the second RACH configuration (420) can use non-overlapping resources in frequency and/or time.

The network device 410 then communicates a message (435) to the UE 405. In some implementations, the information included in message 430 can be included in message 420. The message (435) can cause the UE 405 to enable spectrally extended RACH transmission. The message (435) can also indicate at least one extended spectral resource. The at least one reserved extended spectral resource can be valid for a predefined time period. The message configured to cause the UE to enable the spectrally extended RACH transmission can include at least one of a size of an extended band, a frequency/time location of at least one Physical Random Access Channel (PRACH) resource, at least one cyclic shift available for the at least one reserved extended spectral resource, and at least one property associated with a spectrum shaping filter.

The message configured to cause the UE to enable the spectrally extended RACH transmission can be received in a System Information Block Type 1 (SIB-1) message. Alternatively, the message configured to cause the UE to enable the spectrally extended RACH transmission can be received or in a Medium Access Control (MAC) random access response message. The message including the indication of at least one reserved extended spectral resource can be a SIB-1 message. The at least one reserved extended spectral resource can be a dedicated PRACH resource pool associated with at least one UE supporting spectrally extended RACH transmission.

Finally, the UE 405 can communicate (440) with the network device using spectrally extended RACH. The UE can select between the first RACH configuration (415) and the second RACH configuration (420) based on at least one of UE capability, RACH transmission power, Msg3 payload, and/or path loss. The UE can use a preconfigured quantity of the at least one reserved extended spectral resource. The UE can use a UE varied quantity of the at least one reserved extended spectral resource. The UE availability for the spectrally extended RACH transmission can be based on a message size of an uplink message 3 (Msg3). The spectrally extended RACH transmission can be associated with at least one of a PRACH, a Random Access (RA) Msg3, a RA message A (MsgA), a Contention based PRACH, and/or a Contention-Free PRACH.

Although not shown, the UE 405 can communicate a message to the network device 410, the message including UE 405 capability information associated with a spectrally extended RACH transmission. Further, the UE 405 can determine an uplink (UL) transmission based on Frequency Domain Spectral Shaping (FDSS) and transmit at least one random access procedure message including the UL transmission to the network device 410. The network device 410 can communicate a system information block (SIB) to the UE 405 via one of Radio Resource Control (RRC) signalling or broadcast signalling, the SIB can indicate the spectrally extended random access transmission is available for Group A preambles and Group B preambles.

Although not shown, the network device 410 can communicate a SIB to the UE 405 via one of RRC signalling or broadcast signalling, the SIB can include a RMSI indicating the spectrally extended random access transmission is available only for Group A preambles. The network device 410 can communicate a SIB to the UE 405 via one of RRC signalling or broadcast signalling, the SIB can indicate at least one of the spectrally extended random access transmission is available for Group A preambles to a first group of UE's, the spectrally extended random access transmission is not available for Group A preambles to a second group of UE's, and FDSS with spectrally extended random access transmission uses a Group A preamble.

Figure 5:
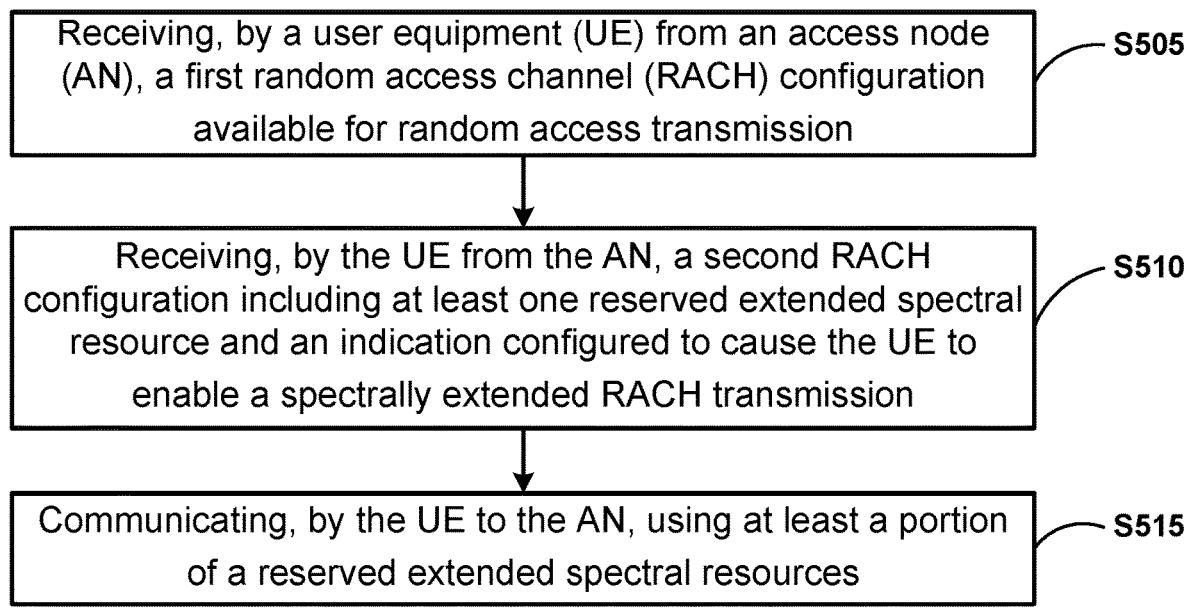
FIG. 5 is a block diagram of a method of operating a user equipment according to an example embodiment.

Example 1. FIG. 5 is a block diagram of a method of operating a user equipment (UE). The method including receiving, by a user equipment (UE) from an access node (AN), a first random access channel (RACH) configuration available for random access transmission, receiving, by the UE from the AN, a second RACH configuration including at least one reserved extended spectral resource and an indication configured to cause the UE to enable a spectrally extended RACH transmission, and communicating, by the UE to the AN, using at least a portion of a reserved extended spectral resources.

Example 2. The method of Example 1 can further comprise transmitting, from the UE to the AN, a message including UE capability information associated with the spectrally extended RACH transmission.

Example 3. The method of Example 1, wherein frequency/time resources of the first RACH configuration can be one of a subset of frequency/time resources of the second RACH configuration and the same as the frequency/time resources of the second RACH configuration, and cyclic shift resources can be split between the first RACH and the second RACH based on a predetermined configuration.

Example 4. The method of Example 1, wherein the first RACH configuration and the second RACH configuration can use non-overlapping resources in at least one of frequency and time.

Example 5. The method of Example 1, wherein the UE can select between the first RACH and second RACH configuration based on at least one of UE capability, RACH transmission power, Msg3 payload, and path loss.

Example 6. The method of Example 1, wherein the UE can use a preconfigured quantity of the at least one reserved extended spectral resource by symmetrical extension of the random access transmission, and an amount of extension can be determined based on the preconfigured quantity.

Example 7. The method of Example 1, wherein the UE can use a UE varied quantity of the at least one reserved extended spectral resource.

Example 8. The method of Example 1, wherein the at least one reserved extended spectral resource can be valid for a predefined time period.

Example 9. The method of Example 1, wherein the second RACH configuration can include at least one of a size of an extended band, a frequency/time location of at least one Physical Random Access Channel (PRACH) resource, at least one cyclic shift available for the at least one reserved extended spectral resource, and at least one property associated with a spectrum shaping filter.

Example 10. The method of Example 1, wherein the indication configured to cause the UE to enable the spectrally extended RACH transmission can be received in a System Information Block Type 1 (SIB-1) message.

Example 11. The method of Example 1, wherein the at least one reserved extended spectral resource can be a dedicated PRACH resource pool associated with at least one UE supporting spectrally extended random access transmission.

Example 12. The method of Example 1, wherein the UE availability for the spectrally extended RACH transmission can be based on a message size of an uplink message 3 (Msg3).

Example 13. The method of Example 1 can further comprise determining, by the UE, an uplink (UL) transmission based on Frequency Domain Spectral Shaping (FDSS) and transmitting, from the UE to the AN, at least one random access procedure message including the UL transmission.

Example 14. The method of Example 1, wherein the spectrally extended RACH transmission can be associated with at least one of a PRACH, a Random Access (RA) Msg3, a RA message A (MsgA), a Contention based PRACH, and a Contention-Free PRACH.

Example 15. The method of Example 1 can further comprise receiving, by the UE from the AN, a system information block (SIB) via one of Radio Resource Control (RRC) signalling or broadcast signalling, the SIB indicating the spectrally extended RACH transmission is available for Group A preambles and Group B preambles.

Example 16. The method of Example 1 can further comprise receiving, by the UE from the AN, a SIB via one of RRC signalling or broadcast signalling, the SIB indicating the spectrally extended RACH transmission is available only for Group A preambles.

Example 17. The method of Example 1 can further comprise receiving, by the UE from the AN, a SIB via one of RRC signalling or broadcast signalling, the SIB indicating at least one of the spectrally extended RACH transmission is available for Group A preambles to a first group of UE's, the spectrally extended RACH transmission is not available for Group A preambles to a second group of UE's, and FDSS with spectrally extended random access transmission uses a Group A preamble.

Figure 6:
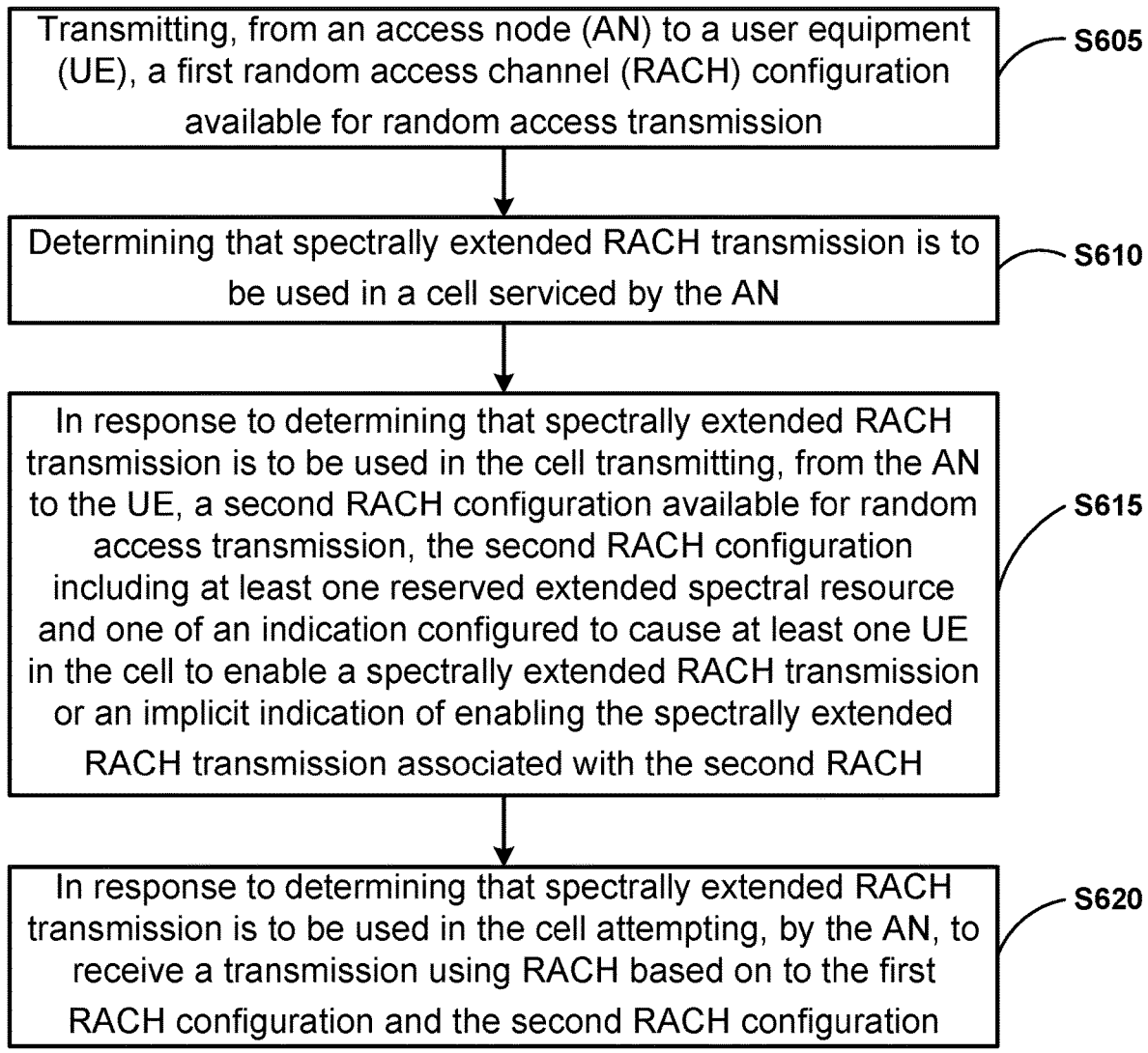
FIG. 6 is a block diagram of a method of operating an access node (e.g., AP, BS, gNB, RAN node, and/or the like) according to an example embodiment.

Example 18. FIG. 6 is a block diagram of a method of operating an access node (AN). The method including transmitting, from an access node (AN) to a user equipment (UE), a first random access channel (RACH) configuration available for random access transmission, determining that spectrally extended RACH transmission is to be used in a cell serviced by the AN, and in response to determining that spectrally extended RACH transmission is to be used in the cell transmitting, from the AN to the UE, a second RACH configuration available for random access transmission, the second RACH configuration including at least one reserved extended spectral resource and one of an indication configured to cause at least one UE in the cell to enable a spectrally extended RACH transmission or an implicit indication of enabling the spectrally extended RACH transmission associated with the second RACH and attempting, by the AN, to receive a transmission using RACH based on to the first RACH configuration and the second RACH configuration.

Example 19. The method of Example 18 can further comprise receiving, by the AN from the UE, a message including UE capability information associated with the spectrally extended RACH transmission.

Example 20. The method of Example 18, wherein frequency/time resources of the first RACH configuration can be one of a subset of frequency/time resources of the second RACH configuration and the same as the frequency/time resources of the second RACH configuration and cyclic shift resources can be split between the first RACH and the second RACH based on a predetermined configuration.

Example 21. The method of Example 18, wherein the first RACH configuration and the second RACH configuration can use non-overlapping resources in at least one of frequency and time.

Example 22. The method of Example 18, wherein the second RACH configuration can instruct the UE to use a preconfigured quantity of the at least one reserved extended spectral resource by symmetrical extension of the random access transmission and an amount of extension can be determined based on the preconfigured quantity.

Example 23. The method of Example 18, wherein the second RACH configuration can instruct the UE to use a UE varied quantity of the at least one reserved extended spectral resource.

Example 24. The method of Example 18, wherein the at least one reserved extended spectral resource can be valid for a predefined time period.

Example 25. The method of Example 18, wherein the second RACH configuration can include at least one of a size of an extended band, a frequency/time location of at least one Physical Random Access Channel (PRACH) resource, at least one cyclic shift available for the at least one reserved extended spectral resource, and at least one property associated with a spectrum shaping filter.

Example 26. The method of Example 18, wherein the second RACH configuration can be communicated via a System Information Block Type 1 (SIB-1) message.

Example 27. The method of Example 18, wherein the at least one reserved extended spectral resource can be a dedicated PRACH resource pool associated with at least one UE supporting spectrally extended random access transmission.

Example 28. The method of Example 18, wherein the determining that at least one UE is capable of a spectrally extended RACH transmission can be based on a message size of an uplink message 3 (Msg3).

Example 29. The method of Example 18, wherein the spectrally extended random access transmission can be associated with at least one of a PRACH, a Random Access (RA) Msg3, a RA message A (MsgA), a Contention based PRACH, and a Contention-Free PRACH.

Example 30. The method of Example 18 can further comprise communicating, by the AN to the UE, a system information block (SIB) via one of Radio Resource Control (RRC) signalling or broadcast signalling, the SIB indicating the spectrally extended random access transmission is available for Group A preambles and Group B preambles.

Example 31. The method of Example 18 can further comprise communicating, by the AN to the UE, a SIB via one of RRC signalling or broadcast signalling, the SIB indicating the spectrally extended random access transmission is available only for Group A preambles.

Example 32. The method of Example 18 can further comprise communicating, by the AN to the UE, a SIB via one of RRC signalling or broadcast signalling, the SIB indicating at least one of the spectrally extended random access transmission is available for Group A preambles to a first group of UE's, the spectrally extended random access transmission is not available for Group A preambles to a second group of UE's, and Frequency Domain Spectral Shaping (FDSS) with spectrally extended random access transmission uses a Group A preamble.

Example 33. A non-transitory computer-readable storage medium comprising instructions stored thereon that, when executed by at least one processor, are configured to cause a computing system to perform the method of any of Examples 1-32.

Example 34. An apparatus comprising means for performing the method of any of Examples 1-32.

Example 35. An apparatus comprising at least one processor and at least one memory including computer program code, the at least one memory and the computer program code configured to, with the at least one processor, cause the apparatus at least to perform the method of any of Examples 1-32.

Figure 7:
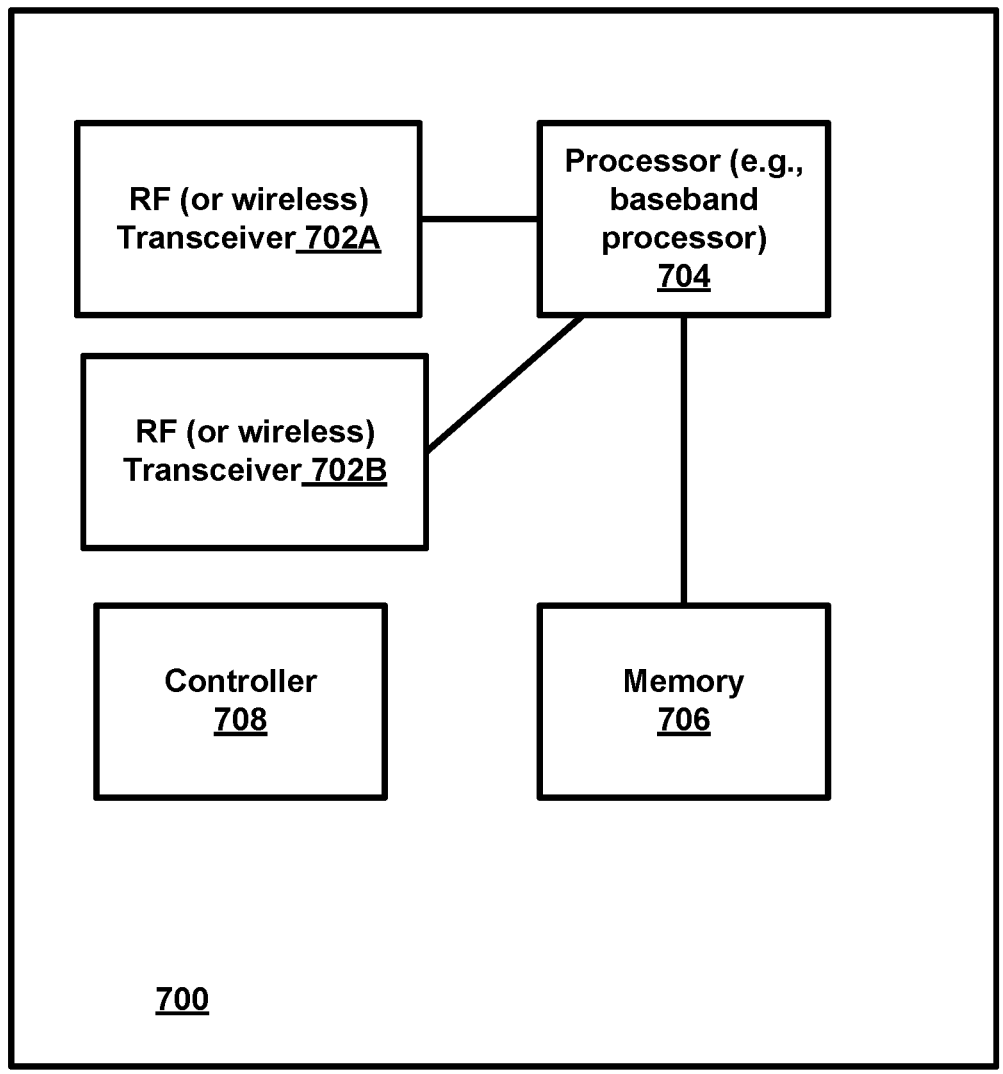
FIG. 7 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 7 is a block diagram of a wireless station 700 or wireless node or network node 700 according to an example embodiment. The wireless node or wireless station or network node 700 may include, e.g., one or more of an AP, BS, gNB, RAN node, relay node, UE or user device, network node, network entity, DU, CU-CP, CU-UP, . . . or other node) according to an example embodiment.

The wireless station 700 may include, for example, one or more (e.g., two as shown in FIG. 7) radio frequency (RF) or wireless transceivers 702A, 702B, where each wireless transceiver includes a transmitter to transmit signals and a receiver to receive signals. The wireless station also includes a processor or control unit/entity (controller) 704 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example embodiment, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a user equipment (UE) from an access node (AN), a first random access channel (RACH) configuration associated with Frequency Domain Spectral Shaping (FDSS) available for random access transmission, the UE being configured to support FDSS with spectrum extension for RACH channels;
   receiving, by the UE from the AN, a second RACH configuration associated with FDSS including the first RACH and at least one reserved extended spectral resource associated with FDSS and an indication configured to cause the UE to enable a spectrally extended RACH transmission; and
   communicating, by the UE to the AN, using at least a portion of a reserved extended spectral resources.

2. The method of claim 1, further comprising transmitting, from the UE to the AN, a message including UE capability information associated with the spectrally extended RACH transmission.

3. The method of claim 1, wherein
   frequency/time resources of the first RACH configuration are one of a subset of frequency/time resources of the second RACH configuration and the same as the frequency/time resources of the second RACH configuration, and
   cyclic shift resources are split between the first RACH and the second RACH based on a predetermined configuration.

4. The method of claim 1, wherein
   the UE uses a preconfigured quantity of the at least one reserved extended spectral resource by symmetrical extension of the random access transmission, and
   an amount of extension is determined based on the preconfigured quantity.

5. The method of claim 1, wherein the second RACH configuration includes at least one of a size of an extended band, a frequency/time location of at least one Physical Random Access Channel (PRACH) resource, at least one cyclic shift available for the at least one reserved extended spectral resource, and at least one property associated with a spectrum shaping filter.

6. The method of claim 1, further comprising:
   determining, by the UE, an uplink (UL) transmission based on Frequency Domain Spectral Shaping (FDSS); and
   transmitting, from the UE to the AN, at least one random access procedure message including the UL transmission.

7. The method of claim 1, further comprising:
   receiving, by the UE from the AN, a system information block (SIB) via one of Radio Resource Control (RRC) signalling or broadcast signalling, the SIB indicating the spectrally extended RACH transmission is available for Group A preambles and Group B preambles.

8. The method of claim 1, further comprising:
   receiving, by the UE from the AN, a SIB via one of RRC signalling or broadcast signalling, the SIB indicating the spectrally extended RACH transmission is available only for Group A preambles.

9. The method of claim 1, further comprising:
   receiving, by the UE from the AN, a SIB via one of RRC signalling or broadcast signalling, the SIB indicating at least one of:
   the spectrally extended RACH transmission is available for Group A preambles to a first group of UE's,
   the spectrally extended RACH transmission is not available for Group A preambles to a second group of UE's, and
   FDSS with spectrally extended random access transmission uses a Group A preamble.

10. A method comprising:
    transmitting, from an access node (AN) to a user equipment (UE), a first random access channel (RACH) configuration associated with Frequency Domain Spectral Shaping (FDSS) available for random access transmission, the UE being configured to support FDSS with spectrum extension for RACH channels;
    determining that spectrally extended RACH transmission associated with FDSS is to be used in a cell serviced by the AN; and
    in response to determining that spectrally extended RACH transmission is to be used in the cell:
    transmitting, from the AN to the UE, a second RACH configuration associated with FDSS available for random access transmission, the second RACH configuration including the first RACH and at least one reserved extended spectral resource associated with FDSS and one of an indication configured to cause at least one UE in the cell to enable a spectrally extended RACH transmission or an implicit indication of enabling the spectrally extended RACH transmission associated with the second RACH, and attempting, by the AN, to receive a transmission using RACH based on to the first RACH configuration and the second RACH configuration.

11. The method of claim 10, further comprising receiving, by the AN from the UE, a message including UE capability information associated with the spectrally extended RACH transmission.

12. The method of claim 10, further comprising:
communicating, by the AN to the UE, a system information block (SIB) via one of Radio Resource Control (RRC) signalling or broadcast signalling, the SIB indicating the spectrally extended random access transmission is available for Group A preambles and Group B preambles.

13. The method of claim 10, further comprising:
communicating, by the AN to the UE, a SIB via one of RRC signalling or broadcast signalling, the SIB indicating the spectrally extended random access transmission is available only for Group A preambles.

14. The method of claim 10, further comprising:
communicating, by the AN to the UE, a SIB via one of RRC signalling or broadcast signalling, the SIB indicating at least one of:
the spectrally extended random access transmission is available for Group A preambles to a first group of UE's,
the spectrally extended random access transmission is not available for Group A preambles to a second group of UE's, and
Frequency Domain Spectral Shaping (FDSS) with spectrally extended random access transmission uses a Group A preamble.

15. An apparatus comprising at least one processor and at least one memory including computer program code, the at least one memory and the computer program code configured to, with the at least one processor, cause the apparatus to:
receive, by the apparatus from an access node (AN), a first random access channel (RACH) configuration associated with Frequency Domain Spectral Shaping (FDSS) available for random access transmission, the apparatus being configured to support FDSS with spectrum extension for RACH channels;

receiving, by the apparatus from the AN, a second RACH configuration associated with FDSS including the first RACH and at least one reserved extended spectral resource associated with FDSS and an indication configured to cause the apparatus to enable a spectrally extended RACH transmission; and communicating, by the apparatus to the AN, using at least a portion of a reserved extended spectral resources.

16. The apparatus of claim 15, wherein
the apparatus uses a preconfigured quantity of the at least one reserved extended spectral resource by symmetrical extension of the random access transmission, and
an amount of extension is determined based on the preconfigured quantity.

17. The apparatus of claim 15, wherein the computer program code further causes the at least one processor to:
determine, by the apparatus, an uplink (UL) transmission based on Frequency Domain Spectral Shaping (FDSS); and
transmit, from the apparatus to the AN, at least one random access procedure message including the UL transmission.

18. The apparatus of claim 15, wherein the computer program code further causes the at least one processor to receive, by the apparatus from the AN, a system information block (SIB) via one of Radio Resource Control (RRC) signalling or broadcast signalling, the SIB indicating the spectrally extended RACH transmission is available for Group A preambles and Group B preambles.

19. The apparatus of claim 15, wherein the computer program code further causes the at least one processor to receive, by the apparatus from the AN, a SIB via one of RRC signalling or broadcast signalling, the SIB indicating the spectrally extended RACH transmission is available only for Group A preambles.

20. The apparatus of claim 15, wherein the computer program code further causes the at least one processor to receive, by the apparatus from the AN, a SIB via one of RRC signalling or broadcast signalling, the SIB indicating at least one of:
the spectrally extended RACH transmission is available for Group A preambles to a first group of UE's,
the spectrally extended RACH transmission is not available for Group A preambles to a second group of UE's, and
FDSS with spectrally extended random access transmission uses a Group A preamble.

* * * * *